(12) United States Patent
Saliya et al.

(10) Patent No.: US 8,410,205 B2
(45) Date of Patent: Apr. 2, 2013

(54) MATTING AGENT COMPOSITION CONTAINING LOW MOLECULAR WEIGHT POLYTRIMETHYLENE ETHER GLYCOL

(75) Inventors: Rajesh Gopalan Saliya, Media, PA (US); Ayumu Yokoyama, Wallingford, PA (US); Hari Babu Sunkara, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 205 days.

(21) Appl. No.: 13/047,085

(22) Filed: Mar. 14, 2011

(65) Prior Publication Data

US 2012/0053277 A1 Mar. 1, 2012

Related U.S. Application Data

(60) Provisional application No. 61/378,667, filed on Aug. 31, 2010.

(51) Int. Cl.
*C08K 5/06* (2006.01)
*B05D 3/02* (2006.01)

(52) U.S. Cl. ........................ 524/377; 427/387

(58) Field of Classification Search ............... 524/377
See application file for complete search history.

(56) References Cited

U.S. PATENT DOCUMENTS

| | | |
|---|---|---|
| 5,270,362 A | 12/1993 | Palmer |
| 5,633,362 A | 5/1997 | Nagarajan et al. |
| 5,686,276 A | 11/1997 | Laffend et al. |
| 5,821,092 A | 10/1998 | Nagarajan et al. |
| 6,221,494 B1 | 4/2001 | Barsotti et al. |
| 6,608,168 B1 | 8/2003 | Ng |
| 6,720,459 B2 | 4/2004 | Sunkara et al. |
| 6,875,514 B2 | 4/2005 | Sormani et al. |
| 6,977,291 B2 | 12/2005 | Sunkara et al. |
| 6,998,154 B2 * | 2/2006 | Barsotti et al. ............ 427/379 |
| 7,169,475 B2 * | 1/2007 | Sormani et al. ............ 428/423.1 |
| 7,728,175 B1 | 6/2010 | Qi et al. |
| 7,816,442 B2 * | 10/2010 | Christian et al. ............ 524/492 |
| 2004/0030095 A1 | 2/2004 | Sunkara et al. |

* cited by examiner

*Primary Examiner* — Hui Chin
(74) *Attorney, Agent, or Firm* — Gann G. Xu

(57) ABSTRACT

The present invention is directed to a matting agent for reducing gloss of a coating. The matting agent comprises: a) a silica component; b) a polytrimethylene ether glycol; c) one or more solvents; and d) optionally, one or more polymers. This invention is further directed to a matting agent comprising components derived from renewable resources.

20 Claims, No Drawings

MATTING AGENT COMPOSITION CONTAINING LOW MOLECULAR WEIGHT POLYTRIMETHYLENE ETHER GLYCOL

FIELD OF INVENTION

The present invention is directed to a matting agent for reducing gloss of a coating. This invention is further directed to a matting agent comprising components derived from renewable resources. This invention is further directed to a method for using the matting agent.

BACKGROUND OF INVENTION

Consumers' and industrial desires on coating appearance are diversified. Sometimes, a preference is given to coatings having low gloss or low luster. These desires present challenges to coating industry for producing coatings that have varied appearances including low gloss or low luster with reduced shining, reflecting light, glitter, sparkle or sheen. Typically, such coatings with low gloss are produced by incorporating a matting agent that imparting matting effect. The matting agent can be inorganic particles, such as silicon compound particles. However, with the addition of such inorganic particles, coatings become brittle and less flexible that could result in less resistance to abrasion, chipping, cracking, or low adhesion.

Therefore, continued needs arise for improved matting agent.

STATEMENT OF INVENTION

This invention is directed to a matting agent comprising:
a) a silica component,
b) a polytrimethylene ether glycol having a Mn (number average molecular weight) in a range of from 134 to 490; and
c) one or more solvents.

The matting agent can further comprise one or more polymers selected from acrylic polymer, polyester polymer, or a combination thereof.

This invention is also directed to a method for reducing gloss of a dry coating layer on a substrate, said coating layer is formed from a coating composition, said method comprising the steps of:
i) providing a matting agent comprising:
  a) a silica component;
  b) a polytrimethylene ether glycol having a Mn (number average molecular weight) in a range of from 134 to 490;
  c) one or more solvents; and
  d) one or more polymers selected from acrylic polymer, polyester polymer, or a combination thereof;
ii) mixing said matting agent with said coating composition to form a matt coating mix;
iii) applying said matt coating mix over said substrate to form a wet coating layer; and
iv) curing said wet coating layer to form said dry coating layer.

DETAILED DESCRIPTION

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

"Gloss" means surface gloss of a coating surface and is related to the amount of incident light that is reflected at the specular reflectance angle of the mean of that surface. Gloss can be measured with a specular glossmeter, such as those available from Byk-Gardener, Geretsried, Germany.

"DOI" (Distinctness of Image) is a quantitative measure of coating appearance that measures the light reflected at and around the specular reflectance angle. It can be determined according to the method described in ASTM D 5767. DOI can be measured with wave scan instruments, such as those available from Byk-Gardener, Geretsried, Germany. DOI measures not only the amount of incident light that is reflected at the specular reflectance angle, but also the distribution of the reflected light around the reflectance specular angle, typically +/−0.3° from the specular angle. A coating surface that gives fuzzy or distorted image generally produces lower DOI reading. A coating reflecting 100% of lights at the specular angle gives a DOI reading of 100.

The term "(meth)acrylate" means methacrylate or acrylate.

The term "two-pack coating composition" or "2K coating composition" refers to a coating composition having two packages that are stored in separate containers and sealed to increase the shelf life of the coating composition during storage. The two packages are mixed just prior to use to form a pot mix, which has a limited pot life, typically ranging from a few minutes (15 minutes to 45 minutes) to a few hours (4 hours to 8 hours). The pot mix is then applied as a layer of a desired thickness on a substrate surface, such as an automobile body. After application, the layer dries and cures at ambient or at elevated temperatures to form a coating on the substrate surface having desired coating properties, such as, adhesion, gloss, and DOI.

The term "one-pack coating composition" or "1K coating composition" refers to a coating composition having one package that can be stored for a certain shelf life. For example, a 1K coating composition can be a UV mono-cure coating composition that can be prepared to form a pot mix and stored in a sealed container. As long as the UV mono-cure coating composition is not exposed to UV radiation, the UV mono-cure coating composition can have indefinite pot life. Other examples of 1K coating composition can include 1K coating compositions having blocked crosslinking agent such as blocked isocyanates, moisture curing 1K coating compositions, oxygen curing 1K coating compositions, or heat curing 1K coating compositions as known in coating industry.

The term "crosslinkable component" refers to a component having "crosslinkable functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with crosslinking functional groups (during the curing step) to produce a coating in the form of crosslinked structures. One of ordinary skill in the art would recognize that certain crosslinkable functional group combinations would be excluded, since, if present, these combinations would crosslink among themselves (self-crosslink), thereby destroying their ability to crosslink with the crosslinking functional groups. A workable combination of crosslinkable functional groups refers to the combinations of crosslinkable functional groups that can be used in coating applications excluding those combinations that would self-crosslink.

Typical crosslinkable functional groups can include hydroxyl, thiol, isocyanate, thioisocyanate, acetoacetoxy, carboxyl, primary amine, secondary amine, epoxy, anhydride, ketimine, aldimine, or a workable combination thereof. Some other functional groups such as orthoester, orthocarbonate, or cyclic amide that can generate hydroxyl or amine groups once the ring structure is opened can also be suitable as crosslinkable functional groups.

The term "crosslinking component" refers to a component having "crosslinking functional groups" that are functional groups positioned in each molecule of the compounds, oligomer, polymer, the backbone of the polymer, pendant from the backbone of the polymer, terminally positioned on the backbone of the polymer, or a combination thereof, wherein these functional groups are capable of crosslinking with the crosslinkable functional groups (during the curing step) to produce a coating in the form of crosslinked structures. One of ordinary skill in the art would recognize that certain crosslinking functional group combinations would be excluded, since, if present, these combinations would crosslink among themselves (self-crosslink), thereby destroying their ability to crosslink with the crosslinkable functional groups. A workable combination of crosslinking functional groups refers to the combinations of crosslinking functional groups that can be used in coating applications excluding those combinations that would self-crosslink. One of ordinary skill in the art would recognize that certain combinations of crosslinking functional group and crosslinkable functional groups would be excluded, since they would fail to crosslink and produce the film forming crosslinked structures. The crosslinking component can comprise one or more crosslinking agents that have the crosslinking functional groups.

Typical crosslinking functional groups can include hydroxyl, thiol, isocyanate, thioisocyanate, acetoacetoxy, carboxyl, primary amine, secondary amine, epoxy, anhydride, ketimine, aldimine, orthoester, orthocarbonate, cyclic amide or a workable combination thereof.

The term "matting agent" refers to a composition that can be used to matt a glossy surface or reduce the gloss of surface. A matting agent can be used to reduce or control gloss of coatings.

This invention is directed to a matting agent that can comprise:
a) a silica component,
b) a polytrimethylene ether glycol having a Mn (number average molecular weight) in a range of from 134 to 490; and
c) one or more solvents.

The matting agent can further comprise:
d) one or more polymers selected from acrylic polymer, polyester polymer, or a combination thereof.

In one embodiment, the matting agent can consist of:
a) a silica component,
b) a polytrimethylene ether glycol having a Mn (number average molecular weight) in a range of from 134 to 490;
c) one or more solvents; and
d) one or more polymers selected from acrylic polymer, polyester polymer, or a combination thereof.

In another embodiment, the matting agent can consist essentially of:
a) a silica component,
b) a polytrimethylene ether glycol having a Mn (number average molecular weight) in a range of from 134 to 490;
c) one or more solvents; and
d) one or more polymers selected from acrylic polymer, polyester polymer, or a combination thereof.

By consisting essentially, the matting agent can contain trace amounts of impurities that may be present in any or all of the silica, the polytrimethylene ether glycol, the solvent, or any of the polymers.

The silica component can comprise silica particles having an average particle size in a range of from 2 to 20 micrometers (μm). In one example, the silica particles have an average particle size in a range of from 2 to 20 micrometers (μm), in another example, in a range of from 2 to 10 micrometers (μm), in yet another example in a range of from 2 to 8 micrometers (μm). In yet another example, the silica component can consist of silica particles having an average particle size in a range of from 2 to 20 micrometers (μm).

The silica particles can have different surface treatment. In one example, the silica particles are organic surface treated silica particles. In another example, silica particles are untreated. In yet another example, the silica particles are thermally treated. Silica particles having hydrophobic surface property can be preferred.

Commercial available silica particles, such those available under the trademark ACEMATT® from marketed Degussa Evonik, can be suitable for this invention. Silica particles that have organic surface-treatment, such as ACEMATT® OK 412 can be preferred.

The polytrimethylene ether glycol can be prepared by an acid-catalyzed polycondensation of 1,3-propanediol (herein referred to as "PDO"), such as described in U.S. Pat. Nos. 6,977,291 and 6,720,459. The polytrimethylene ether glycol can also be prepared by a ring opening polymerization of a cyclic ether, oxetane, such as described in J. Polymer Sci., Polymer Chemistry Ed. 23, 429 to 444 (1985). The polycondensation of 1,3-propanediol is preferred over the use of oxetane since the diol is a less hazardous, stable, low cost, commercially available material and can be prepared by use of petro chemical feed-stocks or renewable resources.

A bio-route via fermentation of a renewable resource can be used to obtain the 1,3-propanediol (PDO). One example of renewable resources is corn since it is readily available and has a high rate of conversion to 1,3-propanediol and can be genetically modified to improve yields to the 1,3-propanediol. Examples of typical bio-route can include those described in U.S. Pat. No. 5,686,276, U.S. Pat. No. 5,633,362 and U.S. Pat. No. 5,821,092. The 1,3-propanediol obtained from the renewable source and the coating compositions therefrom can be distinguished from their petrochemical derived counterparts on the basis of radiocarbon dating such as fraction of modern carbon ($f_M$), also know as $^{14}C$ ($f_M$) and dual carbon-isotopic fingerprinting $^{13}C/^{12}C$ such as the one known as $\delta^{13}C$. The fraction of modern carbon $f_M$ is defined by National Institute of Standards and Technology (NIST) Standard Reference Materials (RFMs) 4990B and 4990C.

The polytrimethylene ether glycol can have a Mn in a range of from 134 to 650. In one example, the polytrimethylene ether glycol can have a Mn in a range of from 134 to 490. In another example, the polytrimethylene ether glycol can have a Mn in a range of from 200 to 400. In yet another example, the polytrimethylene ether glycol can have a Mn in a range of from 250 to 490. The polytrimethylene ether glycol suitable for this disclosure need to be within the aforementioned range of Mn that can be controlled by polymerization process to have polymers with desired range of Mn, fractionation of polymers to obtain polymers having desired range of Mn, or a combination thereof. The polymerization can be controlled, for example by polymerization timing, reaction temperature, reaction pressure, or a combination thereof, to produce polymers having Mn within the aforementioned Mn range. The polytrimethylene ether glycol can be fractionated or unfractionated. In one example, the fractionated polytrimethylene ether glycol can have PDO monomers, dimers, trimer, tetramers, and pentamers. In another example, the fractionated polytrimethylene ether glycol can have dimers, trimer, tetramers, and pentamers. In yet another example, the fractionated polytrimethylene ether glycol can have trimer, tetramers, pentamers and heamers. In further example, the fractionated polytrimethylene ether glycol can have tetramers, pentamers, hexamers and heptamers. In one example, the unfractionated polytrimethylene ether glycol can have, such as, PDO monomers, dimers, trimers, tetramers, pentamers, hexamers and heptamers.

The polytrimethylene ether glycol can include copolymers of polytrimethylene ether glycol that can also be suitable for the coating composition of this disclosure. Examples of such suitable copolymers of polytrimethylene ether glycol can be prepared by copolymerizing 1,3-propanediol with another diol, such as, ethane diol, hexane diol, 2-methyl-1,3-propanediol, 2,2-dimethyl-1,3-propanediol, trimethylol propane and pentaerythritol. In one example, the copolymers of polytrimethylene ether glycol can be polymerized from monomers have 1,3-propanediol in a range of from 50% to 99%. In another example, the copolymers of polytrimethylene ether glycol can be polymerized from monomers have 1,3-propanediol in a range of from 60% to 99%. In yet another example, the copolymers of polytrimethylene ether glycol can be polymerized from monomers have 1,3-propanediol in a range of from 70% to 99%.

One example of copolymers of poytrimethylene ether glycol can be poly(trimethylene-ethylene ether) glycol such as disclosed in US2004/0030095A1. The poly(trimethylene-co-ethylene ether) glycols can be prepared by acid catalyzed polycondensation of in a range of from 50 to 99 mole % (preferably in a range of from 60 to 98 mole %, and more preferably in a range of from 70 to 98 mole %) 1,3-propanediol and in a range of from 50 to 1 mole % (preferably in a range of from 40 to 2 mole %, and more preferably in a range of from 30 to 2 mole %) ethylene glycol.

The polytrimethylene ether glycol can have in a range of from 10% to 100% of dimers, percentage based on the total weight of the polytrimethylene ether glycol. The polytrimethylene ether glycol can have in a range of from 20% to 100% of dimers in an example, in a range of from 30% to 100% of dimers in another example, in a range of from 40% to 100% of dimers in another example, and in a range of from 50% to 100% of dimers in a yet further example, all percentage based on the total weight of the polytrimethylene ether glycol.

The polytrimethylene ether glycol useful in the compositions and methods disclosed herein can contain small amounts of other repeat units, for example, from aliphatic or aromatic diacids or diesters, such as disclosed in U.S. Pat. No. 6,608,168. This type of trimethylene ether glycol oligomer can also be called a "random polytrimethylene ether ester", and can be prepared by polycondensation of 1,3-propanediol reactant and about 10 to about 0.1 mole % of aliphatic or aromatic diacid or esters thereof, such as terephthalic acid, isophthalic acid, bibenzoic acid, naphthalic acid, bis(p-carboxyphenyl)methane, 1,5-naphthalene dicarboxylic acid, 2,6-naphthalene dicarboxylic acid, 2,7-naphthalene dicarboxylic acid, 4,4'-sulfonyl dibenzoic acid, p-(hydroxyethoxy)benzoic acid, and combinations thereof, and dimethyl terephthalate, bibenzoate, isophthlate, naphthalate and phthalate; and combinations thereof. Of these, terephthalic acid, dimethyl terephthalate and dimethyl isophthalate are preferred.

The polytrimethylene ether polymers with functional groups other than hydroxyls end groups can also be used. Examples of polytrimethylene ether glycol oligomers with amine and ester end functional groups can include those disclosed in U.S. Pat. No. 7,728,175.

A blend of polytrimethylene ether glycol having different molecular weights can be used. Blends of the polytrimethylene ether glycol and other cycloaliphatic hydroxyl containing either branched or linear oligomers can be used. Such hydroxyl containing oligomers are known to those skilled in the art. Examples of such hydroxyl containing oligomers can include those disclosed by Barsotti, et al. in U.S. Pat. No. 6,221,494.

Polymers that are suitable for this invention can include linear or branched acrylic polymers, linear or branched polyesters, linear or branched acrylic polymers having hydroxyl functional groups, linear or branched hydroxyl polyesters having hydroxyl functional groups, or a combination thereof.

The acrylic polymer used in the composition can have a weight average molecular weight (Mw) of about 5,000 to 100,000, and a glass transition temperature (Tg) in a range of from −40° C. to 80° C. and contain functional groups or pendant moieties that are reactive with isocyanate or other crosslinking functional groups, such as, for example, hydroxyl, amino, amide, glycidyl, silane and carboxyl groups. These acrylic polymers can be straight chain polymers (also known as linear acrylic polymers), branched polymers, block copolymers, graft polymers, or other types of acrylic polymers.

The acrylic polymers can be polymerized from a plurality of monomers, such as acrylates, methacrylates or derivatives thereof, as known to those skilled in the art.

Suitable monomers can include linear alkyl (meth)acrylates having 1 to 12 carbon atoms in the alkyl group, cyclic or branched alkyl (meth)acrylates having 3 to 12 carbon atoms in the alkyl group, including isobornyl (meth)acrylate, styrene, alpha methyl styrene, vinyl toluene, (meth)acrylonitrile, (meth)acryl amides and monomers that provide crosslinkable functional groups, such as, hydroxy alkyl (meth)acrylates having 1 to 4 carbon atoms in the alkyl group, glycidyl (meth) acrylate, amino alkyl (meth)acrylates having 1 to 4 carbon atoms in the alkyl group, (meth)acrylic acid, and alkoxy silyl alkyl (meth)acrylates, such as, trimethoxysilylpropyl (meth) acrylate.

Suitable monomers can also include, for example, hydroxyalkyl esters of alpha,beta-olefinically unsaturated monocarboxylic acids with primary or secondary hydroxyl groups. These may, for example, comprise the hydroxyalkyl esters of acrylic acid, methacrylic acid, crotonic acid and/or isocrotonic acid. Examples of suitable hydroxyalkyl esters of alpha,beta-olefinically unsaturated monocarboxylic acids with primary hydroxyl groups can include hydroxyethyl (meth)acrylate, hydroxypropyl (meth)acrylate, hydroxybutyl (meth)acrylate, hydroxyamyl (meth)acrylate, hydroxyhexyl (meth)acrylate. Examples of suitable hydroxyalkyl esters with secondary hydroxyl groups can include 2-hydroxypropyl (meth)acrylate, 2-hydroxybutyl (meth)acrylate, 3-hydroxybutyl (meth)acrylate.

Suitable monomers can also include monomers that are reaction products of alpha,beta-unsaturated monocarboxylic acids with glycidyl esters of saturated monocarboxylic acids branched in alpha position, for example with glycidyl esters of saturated alpha-alkylalkanemonocarboxylic acids or alpha,alpha'-dialkylalkanemonocarboxylic acids. These can comprise the reaction products of (meth)acrylic acid with glycidyl esters of saturated alpha,alpha-dialkylalkanemonocarboxylic acids with 7 to 13 carbon atoms per molecule, particularly preferably with 9 to 11 carbon atoms per molecule. These reaction products can be formed before, during or after copolymerization reaction of the acrylic polymer.

Suitable monomers can further include monomers that are reaction products of hydroxyalkyl (meth)acrylates with lactones. Hydroxyalkyl (meth)acrylates which can be used include.

Suitable monomers can also include unsaturated monomers such as, for example, allyl glycidyl ether, 3,4-epoxy-1-vinylcyclohexane, epoxycyclohexyl (meth)acrylate, vinyl glycidyl ether and glycidyl (meth)acrylate, that can be used to provide the acrylic polymer with glycidyl groups.

Suitable monomers can also include monomers that are free-radically polymerizable, olefinically unsaturated monomers which, apart from at least one olefinic double bond, do not contain additional functional groups. Such monomers include, for example, esters of olefinically unsaturated carboxylic acids with aliphatic monohydric branched or unbranched as well as cyclic alcohols with 1 to 20 carbon atoms. Examples of the unsaturated carboxylic acids can include acrylic acid, methacrylic acid, crotonic acid and isocrotonic acid. In one embodiment, esters of (meth)acrylic acid can be used. Examples of esters of (meth)acrylic acid can include methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of esters of (meth)acrylic acid with cyclic alcohols can include cyclohexyl acrylate, trimethylcyclohexyl acrylate, 4-tert.-butylcyclohexyl acrylate, isobornyl acrylate and the corresponding methacrylates.

Suitable monomers can also include unsaturated monomers that do not contain additional functional groups for example, vinyl ethers, such as, isobutyl vinyl ether and vinyl esters, such as, vinyl acetate, vinyl propionate, vinyl aromatic hydrocarbons, preferably those with 8 to 9 carbon atoms per molecule. Examples of such monomers can include styrene, alpha-methylstyrene, chlorostyrenes, 2,5-dimethylstyrene, p-methoxystyrene, vinyl toluene. In one embodiment, styrene can be used.

Suitable monomers can also include small proportions of olefinically polyunsaturated monomers. These olefinically polyunsaturated monomers are monomers having at least 2 free-radically polymerizable double bonds per molecule. Examples of these olefinically polyunsaturated monomers can include divinylbenzene, 1,4-butanediol diacrylate, 1,6-hexanediol diacrylate, neopentyl glycol dimethacrylate, and glycerol dimethacrylate.

The acrylic polymers of this disclosure can generally be polymerized by free-radical copolymerization using conventional processes well known to those skilled in the art, for example, bulk, solution or bead polymerization, in particular by free-radical solution polymerization using free-radical initiators.

The acrylic polymer can contain (meth)acrylamides. Typical examples of such acrylic polymers can be polymerized from monomers including (meth)acrylamide. In one example, such acrylic polymer can be polymerized from (meth)acrylamide and alkyl (meth)acrylates, hydroxy alkyl (meth)acrylates, (meth)acrylic acid and one of the aforementioned olefinically unsaturated monomers.

The polyester suitable for this invention can be linear polyesters having one or more crosslinkable functional groups and having a glass transition temperature (Tg) in a range of from −75° C. to 80° C. Typical suitable linear polyesters can have a hydroxyl number in a range of from 5 to 250. Typical suitable linear polyester can have a weight average molecular weight in a range of from 1,000 to 40,000. The weight average molecular weight can be in a range of from 1,000 to 40,000 in one embodiment, 1,000 to 20,000 in another embodiment, 1,000 to 10,000 in yet another embodiment. The polyesters may be saturated or unsaturated and optionally, may be modified with fatty acids. These polyesters can be the esterification product of one or more polyhydric alcohols, such as, alkylene diols and glycols; and carboxylic acids such as monocarboxylic acids, polycarboxylic acids or anhydrides thereof, such as, dicarboxylic and/or tricarboxylic acids or tricarboxylic acid anhydrides.

One example of suitable linear polyester can be the estrification product of neopentyl glycol, isophthalic acid, adipic acid, pentaerythritol and anhydride.

The polyester can also be highly branched copolyesters. The highly branched copolyester can have a hydroxyl number in a range of from 5 to 200 and can have a weight average molecular weight in a range of from 1,000 to 50,000. The weight average molecular weight can be in a range of from 1,000 to 50,000 in one embodiment, 1,000 to 40,000 in another embodiment, 1,500 to 40,000 in yet another embodiment, 1,500 to 30,000 in yet another embodiment, and 2,000 to 30,000 in further another embodiment. The highly branched copolyester can have one or more hydroxyl crosslinkable function groups.

The highly branched copolyester can be conventionally polymerized from a monomer mixture containing a dual functional monomer selected from the group consisting of a hydroxy carboxylic acid, a lactone of a hydroxy carboxylic acid and a combination thereof; and one or more hyper branching monomers.

One example of a highly branched polyester suitable for this invention can be synthesized by reacting dimethylol propionic acid, pentaerythritol, and caprolactone.

Conventional methods for synthesizing polyesters are known to those skilled in the art. Examples of the conventional methods can include those described in U.S. Pat. No. 5,270,362 and U.S. Pat. No. 6,998,154.

The matting agent of this invention can comprise one or more solvents. Any typical organic solvents commonly used in coating industry can be suitable for this invention. Examples of solvents can include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof. Some commercial available solvents, such as Oxsol® 100 available from MANA, New York, N.Y., USA, under respective registered trademark, can also be used.

The matting agent of this invention can comprise 0 to 20% of water in one example, 0 to 15% of water in another example, 0 to 10% of water in yet another example, 0 to 5% of water in a further example, and 0 to 2% of water in yet another example.

The matting agent of this invention can be mixed with a coating composition to form a matt coating mix for producing a coating with reduced gloss. One advantage of the matting agent of this invention is that the matting agent can be mixed with a broad range of solvent based coating compositions. The coating compositions can include any solvent borne 1K or 2K coating compositions. The coating compositions can also include dual cure coating compositions, such as those can be cured by both UV and crosslinking agent. Most commercially available 1K, 2K or dual cure coating compositions can be suitable for use with the matting agent of this invention. A coating composition having hydroxyl crosslinkable functional groups is preferred.

The coating compositions can include a crosslinking component comprising compounds having crosslinking functional groups. Examples of such compounds can be organic polyisocyanates. Examples of organic polyisocyanates include aliphatic polyisocyanates, cycloaliphatic polyisocyanates, aromatic polyisocyanates and isocyanate adducts. Any isocyanate suitable for coating can be used.

Examples of suitable aliphatic, cycloaliphatic and aromatic polyisocyanates that can be used include the following: 2,4-toluene diisocyanate, 2,6-toluene diisocyanate ("TDI"), 4,4-diphenylmethane diisocyanate ("MDI"), 4,4'-dicyclohexyl methane diisocyanate ("H12MDI"), 3,3'-dimethyl-4, 4'-biphenyl diisocyanate ("TODI"), 1,4-benzene diisocyanate, trans-cyclohexane-1,4-diisocyanate, 1,5-naphthalene diisocyanate ("NDI"), 1,6-hexamethylene diisocyanate ("HDI"), 4,6-xylene diisocyanate, isophorone diisocyanate, ("IPDI"), other aliphatic or cycloaliphatic di-, tri- or tetra-isocyanates, such as, 1,2-propylene diisocyanate, tetramethylene diisocyanate, 2,3-butylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2-cyclohexane diisocyanate, 1,4-cyclohexane diisocyanate, 4-methyl-1,3-diisocyanatocyclohexane, dicyclohexylmethane-4,4'-diisocyanate, 3,3'-dimethyl-dicyclohexyl-methane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets, for example, of hexamethylene diisocyanate, allophanates, trimers and biurets, for example, of isophorone diisocyanate and the isocyanurate of hexane diisocyanate. MDI, HDI, TDI and isophorone diisocyanate are preferred because of their commercial availability.

Tri-functional isocyanates also can be used, such as, triphenyl methane triisocyanate, 1,3,5-benzene triisocyanate, 2,4, 6-toluene triisocyanate. Trimers of diisocyanates, such as, the trimer of hexamethylene diisocyanate, sold as Tolonate® HDT from Rhodia Corporation and the trimer of isophorone diisocyanate are also suitable.

An isocyanate functional adduct can be used, such as, an adduct of an aliphatic polyisocyanate and a polyol or an adduct of an aliphatic polyisocyanate and an amine. Also, any of the aforementioned polyisocyanates can be used with a polyol to form an adduct. Polyols, such as, trimethylol alkanes, particularly, trimethylol propane or ethane can be used to form an adduct.

Depending upon the type of crosslinking agent, the coating composition of this invention can be formulated as one-pack (1K) or two-pack (2K) coating composition. If polyisocyanates with free isocyanate groups are used as the crosslinking agent, the coating composition can be formulated as a two-pack coating composition in that the crosslinking agent is mixed with other components of the coating composition only shortly before mixing with the matting agent of this invention. If blocked polyisocyanates are, for example, used as the crosslinking agent, the coating compositions can be formulated as a one-pack (1K) coating composition.

Typically, the coating composition can also include a catalyst to reduce curing time and to allow curing of the coating composition at ambient temperatures. The ambient temperatures are typically referred to as temperatures in a range of from 18° C. to 35° C. Typical catalysts include organic metal salts, such as, dibutyl tin dilaurate, dibutyl tin diacetate, dibutyl tin dichloride, dibutyl tin dibromide, zinc naphthenate; compounds containing tertiary amino groups, such as, triethylamine; triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

The coating composition can comprise one or more solvents. Examples of solvents can include, but not limited to, aromatic hydrocarbons, such as, toluene, xylene; ketones, such as, acetone, methyl ethyl ketone, methyl isobutyl ketone, methyl amyl ketone and diisobutyl ketone; esters, such as, ethyl acetate, n-butyl acetate, isobutyl acetate and a combination thereof.

The coating composition should comprise no more than 20% of water and can comprise 0 to 20% of water in one example, 0 to 15% of water in another example, 0 to 10% of water in yet another example, 0 to 5% of water in a further example, and 0 to 2% of water in yet another example.

Typically, the coating composition can contain conventional inorganic and organic colored pigments, metallic flakes and powders, such as, aluminum flake and aluminum powders; special effects pigments, such as, coated mica flakes, coated aluminum flakes colored pigments, or a combination thereof can be used.

The coating composition can also comprise one or more ultraviolet light stabilizers. Examples of such ultraviolet light stabilizers can include ultraviolet light absorbers, screeners, quenchers, and hindered amine light stabilizers. An antioxidant can also be added to the coating composition.

Typical ultraviolet light stabilizers can include benzophenones, triazoles, triazines, benzoates, hindered amines and mixtures thereof. A blend of hindered amine light stabilizers, such as Tinuvin® 328 and Tinuvin®123, all commercially available from Ciba Specialty Chemicals, Tarrytown, N.Y., under respective registered trademark, can be used.

Typical ultraviolet light absorbers can include hydroxyphenyl benzotriazoles, such as, 2-(2-hydroxy-5-methylphenyl)-2H-benzotrazole, 2-(2-hydroxy-3,5-di-tert.amyl-phenyl)-2H-benzotriazole, 2[2-hydroxy-3,5-di(1,1-dimethylbenzyl)phenyl]-2H-benzotriazole, reaction product of 2-(2-hydroxy-3-tert.butyl-5-methyl propionate)-2H-benzotriazole and polyethylene ether glycol having a weight average molecular weight of 300, 2-(2-hydroxy-3-tert.butyl-5-iso-octyl propionate)-2H-benzotriazole; hydroxyphenyl s-triazines, such as, 2-[4((2,-hydroxy-3-dodecyloxy/tridecyloxypropyl)-oxy)-2-hydroxyphenyl]-4,6-bis(2,4-dimethylphenyl)-1,3,5-triazine, 2-[4(2-hydroxy-3-(2-ethylhexyl)-oxy)-2-hydroxyphenyl]-4,6-bis(2,4-dimethylphenyl)1,3,5-triazine, 2-(4-octyloxy-2-hydroxyphenyl)-4,6-bis(2,4-dimethylphenyl)-1,3,5-triazine; hydroxybenzophenone U.V. absorbers, such as, 2,4-dihydroxybenzophenone, 2-hydroxy-4-octyloxybenzophenone, and 2-hydroxy-4-dodecyloxybenzophenone.

Typical hindered amine light stabilizers can include N-(1,2,2,6,6-pentamethyl-4-piperidinyl)-2-dodecyl succinimide, N(1acetyl-2,2,6,6-tetramethyl-4-piperidinyl)-2-dodecyl succinimide, N-(2hydroxyethyl)-2,6,6,6-tetramethylpiperidine-4-ol-succinic acid copolymer, 1,3,5 triazine-2,4,6-triamine, N,N'''-[1,2-ethanediybis[[[4,6-bis[butyl(1,2,2,6,6-pentamethyl-4-piperidinyl)amino]-1,3,5-triazine-2-yl]imino]-3,1-propanedinyl]]bis[N,N'''-dibutyl-N', N'''-bis(1,2,2,6,6-pentamethyl-4-piperidinyl)], poly-[[6-[1,1,3,3-tetramethylbutyl)-amino]-1,3,5-trianzine-2,4-diyl][2,2,6,6-tetramethylpiperidinyl)-imino]-1,6-hexane-diyl[(2,2,6,6-tetramethyl-4-piperidinyl)-imino]), bis(2,2,6,6-tetramethyl-4-piperidinyl)sebacate, bis(1,2,2,6,6-pentamethyl-4-piperidinyl)sebacate, bis(1-octyloxy-2,2,6,6-tetramethyl-4-piperidinyl)sebacate, bis(1,2,2,6,6-pentamethyl-4-piperidinyl)[3,5bis(1,1-dimethylethyl-4-hydroxy-phenyl)methyl]butyl propanedioate, 8-acetyl-3-dodecyl-7,7,9,9,-tetramethyl-1,3,8-triazaspiro(4,5)decane-2,4-dione, and dodecylitetradecyl-3-(2,2,4,4-tetramethyl-21-oxo-7-oxa-3, 20-diazal dispiro(5.1.11.2)henicosan-20-yl)propionate.

Typical antioxidants can include tetrakis[methylene(3,5-di-tert-butylhydroxy hydrocinnamate)]methane, octadecyl 3,5-di-tert-butyl-4-hydroxyhydrocinnamate, tris(2,4-di-tert-butylphenyl) phosphite, 1,3,5-tris(3,5-di-tert-butyl-4-hydroxybenzyl)-1,3,5-triazine-2,4,6(1H,3H,5H)-trione and benzenepropanoic acid, 3,5-bis(1,1-dimethyl-ethyl)-4-hydroxy-C7-C9 branched alkyl esters. Typically useful antioxidants can also include hydroperoxide decomposers, such as Sanko® HCA (9,10-dihydro-9-oxa-10-phosphenanthrene-10-oxide), triphenyl phosphate and other organo-phosphorous compounds, such as, Irgafos® TNPP from Ciba Specialty Chemicals, Irgafos® 168, from Ciba Specialty Chemicals, Ultranox® 626 from GE Specialty Chemicals, Mark PEP-6 from Asahi Denka, Mark HP-10 from Asahi Denka, Irgafos® P-EPQ from Ciba Specialty Chemicals, Ethanox 398 from Albemarle, Weston 618 from GE Specialty Chemicals, Irgafos® 12 from Ciba Specialty Chemicals, Irgafos® 38 from Ciba Specialty Chemicals, Ultranox® 641 from GE Specialty Chemicals and Doverphos® S-9228 from Dover Chemicals.

The coating compositions can comprise conventional coating additives. Examples of such additives can include wetting agents, leveling and flow control agents, for example, Resiflow®S (polybutylacrylate), BYK® 320 and 325 (high molecular weight polyacrylates), BYK® 347 (polyether-modified siloxane) under respective registered trademarks, leveling agents based on (meth)acrylic homopolymers; rheological control agents; thickeners, such as partially crosslinked polycarboxylic acid or polyurethanes; and anti-foaming agents. The additives can be used in conventional amounts familiar to those skilled in the art.

The matt coating mix produced by mixing the matting agent and a coating composition can be suitable for use as vehicle or industrial coatings for producing a coating with certain properties, such as reduced gloss. The matt coating mix and can be applied using known processes, such as spraying, electrostatic spraying, dipping, brushing, rolling, or flow coating. In the context of vehicle coating, the coating composition can be used both for vehicle original equipment manufacturing (OEM) coating and for repairing or refinishing coatings of vehicles and vehicle parts. Curing of the coating composition can be accomplished at ambient temperatures, such as temperatures in a range of from 18° C. to 35° C., or at elevated temperatures, such as at temperatures in a range of from 35° C. to 150° C. Typical curing temperatures of 20° C. to 80° C., in particular of 20° C. to 60° C., can be used.

The use of polytrimethylene ether glycol in coating compositions has been described in U.S. Pat. Nos. 6,875,514 and 7,169,475. The polytrimethylene ether glycol is believed to provide improved flexibility to a coating therefore improving chip resistance.

This invention is further directed to a method for reducing gloss of a dry coating layer on a substrate. The coating layer can be formed from a coating composition. The method can comprise the steps of:

i) providing a matting agent comprising:
   a) a silica component;
   b) a polytrimethylene ether glycol having a Mn (number average molecular weight) in a range of from 134 to 490;
   c) one or more solvents; and
   d) one or more polymers selected from acrylic polymer, polyester polymer, or a combination thereof;

ii) mixing said matting agent with the coating composition to form a matt coating mix;

iii) applying said matt coating mix over the substrate to form a wet coating layer; and iv) curing said wet coating layer to form said dry coating layer.

In one embodiment, the matting agent can consist of:
a) a silica component,
b) a polytrimethylene ether glycol having a Mn (number average molecular weight) in a range of from 134 to 490;
c) one or more solvents; and
d) one or more polymers selected from acrylic polymer, polyester polymer, or a combination thereof.

In another embodiment, the matting agent can consist essentially of:
a) a silica component,
b) a polytrimethylene ether glycol having a Mn (number average molecular weight) in a range of from 134 to 490;
c) one or more solvents; and
d) one or more polymers selected from acrylic polymer, polyester polymer, or a combination thereof.

The substrate can include, but not limited to: treated metal; bare metal such as blasted steel; aluminum or other metal or alloys; plastic, such as sheet molded composite (SMC), Reaction Injection Molding (RIM), thermoplastic olefins (TPO) or other resinous materials; glass, concrete, fiberglass, rock, stone or other man-made or nature materials. The substrate can also include consumer electronics such as call phones, TV, digital game devices, telephone set; consumer appliances, such as refrigerator, washing machine, dishwasher, or microwave set; sporting goods, such as ski board, bike, and other sport equipments; tools and instruments, such as hand tools, machines, or other devices; a vehicle body or vehicle body parts; steel tanks; metal or plastic pipelines; buildings, window frames, guard rails, or other residential or industrial structures.

The matt coating mix can be applied to the substrate using conventional coating application methods, such as spray, rolling, brush, or any other coating application methods known to those skilled in the art.

The wet coating layer can be cured at ambient or elevated temperatures to form the dry coating layer. Typically the coating layer can be cured at a temperature in a range of from 18° C. to 60° C. Typically the coating layer can be cured for a time period, such as in a range of from 30 minutes to 24 hours, or any other time period determined necessary by those skilled in the art.

This invention is further directed to a substrate coated with the matt coating mix comprising the matting agent.

This invention is even further directed to a substrate coated with the process described above.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Procedure 1

Preparation of Polytrimethylene Ether Glycol Having Number Average Molecular Weight 250

Twelve kilogram (kg) renewably sourced 1,3-propanediol (PDO) monomers commercially available from DuPont Tate & Lyle Bioproducts, Wilmington, Del., USA, were added to a 20 L glass reactor equipped with a condenser and an agitator. The glass reactor was purged with $N_2$ at the rate 3 L/min. Triflic acid (trifluoromethanesulfonic acid) was added into the reactor to a final concentration of 0.1 wt % and the mixture was heated up to 180° C. with agitation set to 200 RPM to allow the acid-catalyzed polycondensation to proceed. The reaction volatiles were condensed in the condenser and the crude polymer product was retained in the reactor. Crude polymer samples were taken periodically for color and molecular weight analysis. Once the desired Mn was achieved, the polymerization was terminated by turning the heat down. The polymer was neutralized by treating the crude polymer with XUS ion exchange resin, available from Dow Chemical, Midland, Mich., USA, in 2 stages. In the first stage, 2 weight parts of the XUS ion exchange resin and 98 weight parts of the crude polymer were mixed at a temperature of about 105° C. for about 1 hour. In the second stage, an additional 2 weight parts of the XUS ion exchange resin was added to the crude polymer and further mixed for additional 3 hours. Neutralization was conducted under sub-surface nitrogen sparging of 5 L/min and a mixing speed of 200 RPM. The product was filtered to remove the ion exchange resin. Filtration was done at 60° C. Once the product was free of solids, it was dried by heating to about 95° C., with sub-surface nitrogen sparging of about 10 L/min and mixing speed of 150 RPM. An antioxidant, BHT (Butylated hydroxyl toluene), available from Aldrich, St. Louis, Mo., USA, was added to the crude polymer to a final concentration about 200 ppm.

Procedure 2

Fractionation of Polytrimethylene Ether Glycol

To a 500 mL, 3-neck round bottom flask equipped with a mechanical stirrer, a distillation adapter, a condenser and a graduated distillation receiver, 367.6 g of polytrimethylene ether glycol having number average molecular weight of 250 was added. The polymer was heated with a proportional integral derivative (PID) controller connected to a heating mantle and thermocouple. The controller was set to maintain a batch temperature of 50° C. at a power setting of 50% (300 mL–2 L). The flask was fully vacuumed to less than 5 torr, then the controller was turned on, and the reaction was stirred at 200 rpm. The temperature set point and the stirring speed were increased to a maximum of 280° C. and 300 rpm, respectively as the distillation progressed. Several fractions were collected, approximately every 20 mL, using the distilling receiver to remove the flask containing the fraction while maintaining the vacuum on the distillation flask. The temperature controller and vacuum pump were turned off after 8 hours and the remaining material was allowed to cool overnight under a blanket of nitrogen.

TABLE 1

Fractionation of polytrimethylene ether glycol.

|  | PDO | Dimer | Trimer | Tetramer | Pentamer | Heamer | Heptamer |
|---|---|---|---|---|---|---|---|
| Unfractionated | 2.7% | 15.0% | 20.0% | 22.4% | 18.6% | 15.9% | 3.8% |
| B-1 | 32.9% | 46.5% | 12.7% | 0.9% | — | — | — |
| B-2 | 16.6% | 52.0% | 21.8% | 5.0% | — | — | — |
| B-3 | 4.9% | 52.4% | 31.4% | 8.7% | 0.6% | — | — |
| B-4 | 1.7% | 43.4% | 36.4% | 15.6% | 1.1% | — | — |
| B-5 | 0.5% | 37.4% | 40.4% | 18.4% | 1.8% | — | — |
| B-6 | — | 27.9% | 44.1% | 23.4% | 3.2% | — | — |
| B-7 | — | 17.2% | 44.0% | 30.9% | 6.7% | — | — |
| B-8 | — | 9.7% | 42.8% | 36.5% | 9.7% | — | — |
| B-9 | — | 2.0% | 41.8% | 42.0% | 12.8% | — | — |
| B-10 | — | — | 30.5% | 46.0% | 19.8% | 2.3% | — |
| B-11 | — | — | 18.9% | 48.1% | 26.9% | 5.3% | — |
| B-12 | — | — | 10.6% | 49.5% | 32.3% | 7.0% | — |
| B-13 | — | — | 3.9% | 47.7% | 38.5% | 9.4% | — |
| B-14 | — | — | 0.6% | 41.6% | 45.0% | 12.2% | — |
| B-15 | — | — | — | 28.7% | 49.7% | 20.4% | 0.7% |
| B-16 | — | — | — | 17.0% | 51.4% | 27.6% | 2.0% |

The fractions were analyzed by GC-MS and concentrations of oligomers present in unfractionated and fractionated polytrimethylene ether glycol are reported in Table 1.

Calculated number average molecular weights (Mn) for the polytrimethylene ether glycol are shown in Table 2.

TABLE 2

Number average molecular weight (Mn).

| Polytrimethylene ether glycol | Calculated Mn |
|---|---|
| Dimer | 134 |
| Trimer | 192 |
| Tetramer | 250 |
| Pentamer | 308 |
| Hexamer | 366 |
| Heptamer | 424 |

Procedure 3

Preparation of Acrylic Polymers

Acrylic polymers were formed by free-radical copolymerization as described above with monomer ratio as described below. Charge to a reactor equipped with a stirrer, reflux condenser and under nitrogen 13.7 parts t-butylacetate. Heat to reflux, at approximately 96° C. Premix a monomer mixture of 14.6 parts methyl methacrylate, 5.9 parts styrene, 11.7 parts hydroxyethyl methacrylate, 14.6 parts n-butyl acrylate, 11.7 parts 2-ethylhexyl methacrylate, 1.2 parts t-butylacetate. Premix an initiator mixture of 3.4 parts Vazo® 67 (Vazo® 67 is available from E.I. DuPont de Nemours and Company, Wilmington, Del., USA, and under respective registered trademark) and 23.2 parts t-butylacetate. Feed monomer mixture over 360 minutes at reflux simultaneously with the initiator mixture. Feed initiator mixture over 390 minutes. After the initiator mixture feed was complete, hold 60 minutes at reflux. Then cool to room temperature.

The acrylic polymer resin produced herein had the following characteristics: a calculated Tg of +17.6° C., solids 60%, Gardner-Holdt viscosity Y+¼, and weight average molecular weight (Mw) of 10,000.

Procedure 4

Preparation of Polyesters (A) Preparation of Linear Polyesters:

A linear polyester was prepared by charging the following ingredients according to Table 3 into a reaction vessel equipped with a heating mantle, water separator, thermometer and stirrer, and under nitrogen.

TABLE 3

Reaction Ingredients (grams).

| | Weight |
|---|---|
| Portion 1 | |
| Xylene | 19.553 |
| Pentaerythritol | 93.58 |
| Benzoic acid | 167.89 |

TABLE 3-continued

Reaction Ingredients (grams).

| | Weight |
|---|---|
| Portion 2. | |
| Neopentyl glycol | 296.21 |
| Isophthalic acid | 142.80 |
| Phthallic anhydride | 127.29 |
| Adipic acid | 62.78 |
| Xylene | 15.26 |
| Portion 3 | |
| Ethyl acetate | 113.51 |

Portion 1 was added to the reactor and heated to its reflux temperature, about 190° C. The reactor was heated stepwise to 215° C. and held until the acid number was 33 or less. After cooling the reactor to 80° C., Portion 2 was added and the reactor was heated to reflux, about 175° C. The temperature was then increased stepwise to 215° C. That temperature was held until an acid number between 3 and 7 at about 98 wt % solids was reached. Portion 3 was added after cooling to about 80° C. The resulting polymer had a wt % solids of about 82%, and Gardner-Holdt viscosity between Z1+½ to Z3+¼. The linear polyester has a weight molecular weight of Mw 1,700, and a Tg of +3° C.

(B) Preparation of Branched Polyesters:

Branched polyester was prepared by charging the following ingredients in Table 4 into a reaction vessel equipped with a heating mantle, short path distillation head with a water separator, thermometer and stirrer, and under nitrogen.

TABLE 4

Reaction Ingredients (Parts by Weight).

| | Parts by weight |
|---|---|
| Portion 1 | |
| Caprolactone | 376.04 |
| Stannous octoate | 2.83 |
| Xylene | 43.52 |
| Portion 2 | |
| Dimethylol propionic acid | 188.02 |
| Pentaerythritol | 7.62 |
| Portion 3 | |
| Methyl amyl ketone | 252.22 |

Portion 1 was added to the reactor in order with mixing and heated to about 70° C. Portion 2 was then added to the reactor and the reaction mixture was heated to its reflux temperature (170-200° C.) and the water of reaction was collected in the water separator. The reaction mixture was not allowed to exceed 200° C. and was held at temperature until an acid number less than 3 at 92.7 wt % solids was obtained. The polymer solution was thinned with Portion 3 to desired solids and viscosity. The resulting polymer had a wt % solids between 64.5 and 67.5 wt % and a Gardner-Holdt viscosity between N and R.

Matting Agent Examples

Matting agents are prepared according to Table 5.

TABLE 5

Matting Agent Compositions (parts in weight).

| | Exp 1 | Exp 2 | Exp 3 | Exp 4 | Exp 5 | Exp 6 |
|---|---|---|---|---|---|---|
| Organic Silica [1] | 10 | — | 10 | — | 10 | — |
| Fumed silica [2] | — | 10 | — | 10 | — | 10 |
| Unfractionated Polytrimethylene ether glycol [3] | 5 | 5 | — | — | 5 | — |
| Fractionated Polytrimethylene ether glycol [4] | — | — | 3 | 3 | — | 3 |
| Acrylic polyol polymer [5] | 15 | 15 | — | — | 7.5 | 7.5 |
| Linear polyester polyol [6] | — | — | 15 | 15 | 7.5 | 7.5 |
| Branched polyester polyol [7] | — | — | — | — | — | — |
| Solvent [8] | 70 | 70 | 70 | 70 | 70 | 70 |
| Total | 100 | 100 | 98 | 98 | 100 | 98 |

| | Exp 7 | Exp 8 | Exp 9 | Exp 10 | Exp 11 | Exp 12 |
|---|---|---|---|---|---|---|
| Organic Silica [1] | 5 | 5 | 5 | 5 | 5 | 5 |
| Fumed silica [2] | 5 | 5 | 5 | 5 | 5 | 5 |
| Unfractionated Polytrimethylene ether glycol [3] | 5 | — | 5 | — | 5 | — |
| Fractionated Polytrimethylene ether glycol [4] | — | 3 | — | 3 | — | 3 |
| Acrylic polyol polymer [5] | 15 | 15 | — | — | 7.5 | 7.5 |
| Linear polyester polyol [6] | — | — | 15 | 15 | 7.5 | 7.5 |
| Branched polyester polyol [7] | — | — | — | — | — | — |
| Solvent [8] | 70 | 70 | 70 | 70 | 70 | 70 |
| Total | 100 | 98 | 100 | 98 | 100 | 98 |

| | Exp 13 | Exp 14 | Exp 15 | Exp 16 | Exp 17 | Exp 18 |
|---|---|---|---|---|---|---|
| Organic Silica [1] | 10 | — | 5 | 10 | — | 10 |
| Fumed silica [2] | — | 10 | 5 | — | 10 | — |
| Unfractionated Polytrimethylene ether glycol [3] | 5 | — | 5 | — | 5 | — |
| Fractionated Polytrimethylene ether glycol [4] | — | 3 | — | 3 | — | 3 |
| Acrylic polyol polymer [5] | — | — | 7.5 | — | — | — |
| Linear polyester polyol [6] | — | — | — | 7.5 | 7.5 | — |
| Branched polyester polyol [7] | 15 | 15 | 7.5 | 7.5 | 7.5 | — |
| Solvent [8] | 70 | 70 | 70 | 70 | 70 | 85 |
| Total | 100 | 98 | 100 | 98 | 100 | 98 |

[1] Organic Silica OK412: available as ACEMATT ® OK 412 from Evonik Industries AG, Essen, Germany under respective registered trademark.
[2] Fumed silica TS-100: available as ACEMATT ® TS 100 from Evonik Industries AG, Essen, Germany under respective registered trademark.
[3] The polytrimethylene ether glycol is from Procedure 1 without fractionation.
[4] The fractionated polytrimethylene ether glycol is the B-3 fraction from Procedure 2.
[5] Acrylic polymer is from Procedure 3.
[6] Linear polyester is from Procedure 4(A).
[7] Branched polyester is from Procedure 4(B).
[8] Oxsol ® 100 is a solvent available from MANA, New York, NY, USA, under respective registered trademark.

What is claimed is:

1. A matting agent comprising:
   a) a silica component,
   b) a polytrimethylene ether glycol having a Mn (number average molecular weight) in a range of from 134 to 490; and
   c) one or more solvents;
   wherein said polytrimethylene ether glycol is fractionated and free from hexamers and heptamers of 1,3-propanediol.

2. The matting agent of claim 1 further comprising:
   d) one or more polymers selected from acrylic polymer, polyester polymer, or a combination thereof.

3. The matting agent of claim 1, wherein the polytrimethylene ether glycol has a Mn in a range of from 200 to 490.

4. The matting agent of claim 1, wherein the polytrimethylene ether glycol has in a range of from 10% to 100% of dimers, percentage based on the total weight of the polytrimethylene ether glycol.

5. The matting agent of claim 1, wherein the polytrimethylene ether glycol is polymerized from bio-derived 1,3-propanediol.

6. The matting agent of claim 1, wherein said silica component comprises silica particles having an average particle size in a range of from 2 to 20 micrometers.

7. The matting agent of claim 6, wherein said silica particles are hydrophobic silica particles.

8. The matting agent of claim 2, wherein said acrylic polymers are selected from linear or branched acrylic polymers having one or more hydroxyl functional groups, or a combination thereof.

9. The matting agent of claim 2, wherein said polyester polymers are selected from linear or branched polyester polymers having one or more hydroxyl functional groups, or a combination thereof.

10. A method for reducing gloss of a dry coating layer on a substrate, said coating layer is formed from a coating composition, said method comprising the steps of:
   i) providing a matting agent comprising:
      a) a silica component;
      b) a polytrimethylene ether glycol having a Mn (number average molecular weight) in a range of from 134 to 490;
      c) one or more solvents wherein said polytrimethylene ether glycol is fractionated and free from hexamers and heptamers of 1,3-propanediol; and
      d) one or more polymers selected from acrylic polymers, polyester polymers, or a combination thereof.
   ii) mixing said matting agent with said coating composition to form a matt coating mix;
   iii) applying said matt coating mix over said substrate to form a wet coating layer; and
   iv) curing said wet coating layer to form said dry coating layer.

11. The method of claim 10, wherein said coating composition comprises a crosslinakble component and a crosslinking component.

12. The method of claim 11, wherein said crosslinkable component comprises hydroxyl crosslinkable functional groups.

13. The method of claim 11, wherein said crosslinking component comprises isocyanate crosslinking functional groups.

14. The method of claim 10, wherein said silica component comprises silica particles having an average particle size in a range of from 2 to 20 micrometers.

15. The method of claim 14, wherein said silica particles are hydrophobic silica particles.

16. The method of claim 10, wherein said coating composition is selected from a one-pack coating composition or a two-pack coating composition.

17. The method of claim 10, wherein said substrate is selected from tools, equipments, sporting goods, vehicle body, vehicle body parts, consumer electronics, consumer appliances, residential or industrial structures.

18. A substrate coated with the method of claim 10.

19. A substrate coated with a matt coating mix comprising the matting agent of claim 1 and a coating composition.

20. The matting agent of claim 1, wherein said polytrimethylene ether glycol is free from hexamers and heptamers of 1,3-propanediol as analyzed by GC-MS.

* * * * *